United States Patent

Greby et al.

[11] 4,080,015
[45] Mar. 21, 1978

[54] BEARING AND METHOD FOR MANUFACTURING SAME

[75] Inventors: Daniel F. Greby, Los Alamitos; Francis E. Corse, Costa Mesa, both of Calif.

[73] Assignee: Lear Siegler, Inc., Santa Ana, Calif.

[21] Appl. No.: 710,948

[22] Filed: Aug. 2, 1976

[51] Int. Cl.² .......................................... F16C 23/08
[52] U.S. Cl. ...................................... 308/72; 277/183
[58] Field of Search ..................... 308/36.1, 72, 187; 277/183, 181

[56] References Cited

U.S. PATENT DOCUMENTS

| | | | |
|---|---|---|---|
| 3,506,315 | 4/1970 | Young | 308/72 |
| 3,627,389 | 12/1971 | Foote | 308/72 |
| 3,873,166 | 3/1975 | Berg et al. | 308/72 X |

*Primary Examiner*—Joseph F. Peters, Jr.
*Assistant Examiner*—Gene A. Church
*Attorney, Agent, or Firm*—Reising, Ethington, Barnard, Perry & Brooks

[57] ABSTRACT

A bearing and a method for making the bearing incorporate annular elastomeric seals that are molded within annular edge grooves of an outer race so as to be bonded thereto while in slidable engagement with an outer spherical surface of a bearing element received within the race. The edge grooves of the race preferably have a relatively rough surface finish in relationship to the outer spherical surface of the bearing element so that there is good bonding of the seals to the race as well as good sealing thereof with the bearing element. Two preferred embodiments each incorporate a lining that is bonded to the outer race prior to a swaging operation which locates the race grooves adjacent the outer surface of the bearing element such that the seals are also bonded to annular edges of the lining during molding within the grooves. One of the lined embodiments has counterbores provided in the race so as to form its annular grooves, and the swaging operation provides the grooves with inwardly facing surfaces for maintaining the seals against outward movement in cooperation with the bonding. The other lined embodiment has outwardly facing chamfers forming its grooves. Two unlined embodiments also incorporate the annular seals molded within their associated race grooves, one of these embodiments having the counterbored grooves, and the other embodiment having chamfered grooves. Polyurethane elastomer is preferably used as the elastomeric material forming the seals and is also reacted as well as cured in the race grooves so as to provide good bonding and sealing.

10 Claims, 8 Drawing Figures

BEARING AND METHOD FOR MANUFACTURING SAME

BACKGROUND OF THE INVENTION

1. Field of the Invention

This invention relates to spherical bearings and a method for making such bearings with seals for preventing the entrance of grit or other deleterious materials between slidably engaged bearing surfaces.

2. Description of the Prior Art

Spherical bearings of the type to which the present invention relates include an inner bearing element, usually a truncated ball, and an annular race that receives the inner bearing element so that slidably engaged surfaces permit relative movement between the bearing element and the race. While bearings of this type are commonly referred to as spherical bearings, they are also referred to as self-aligning rod ends. One type of such bearing has spherical metallic surfaces of the bearing race and the inner bearing element engaged directly with each other to provide the rotatable support that permits the relative movement between the bearing components. Often a grease or oil fitting is provided for introducing lubricant between the spherical metallic surfaces of this type of bearing in order to reduce the friction which resists relative movement between the bearing components. Low friction characteristics without lubricants is also possible by lining the inner spherical surface of the race with a low friction material. Such linings can consist of mixtures of organic resins such as, for example, a mixture of particulate polytetrafluoroethylene and a phenolic or other thermosetting or thermoplastic resins or such linings can consist of other materials or a combination of materials to provide the desired low friction characteristics along with the required compressive strength and other necessary physical properties. The preferred and most commonly used low friction linings for such bearings are formed of cloth which includes polytetrafluoroethylene fibers or threads and preferably also fibers or threads of more bondable material, impregnated with and bonded to the interior surface of a race by a hardened organic resin such as a phenolic resin. Such bearings and bearing liners are the subject matter of U.S. Pat. Nos. 2,885,248, Re. 24,765, and 3,037,893.

Regardless of whether spherical bearings are of the lined or unlined type, it is important to prevent the entrance of grit, organic solvents or other deleterious materials between the spherical bearing surfaces. To prevent this entrance, prior art bearings have incorporated seals secured with respect to the outer race and slidably engaged with the outer spherical surface of the bearing element. Heretofore, these seals have been premolded and then secured with respect to the race so as to slidably seal with the bearing element. Examples of such seals are shown by U.S. Pat. Nos.3,243,212 and 3,873,166.

SUMMARY OF THE INVENTION

An object of the present invention is to provide a spherical bearing and a method for making the bearing so as to incorporate improved annular seals.

In carrying out the above object and other subjects, the bearing includes a race having annular edge grooves located adjacent an outer spherical surface of its inner bearing element. Elastomeric material is molded within the edge grooves of the race with the bearing element in position so as to be bonded to the edge grooves of the race while in slidable engagement with the spherical bearing element surface in a sealed relationship. The outer spherical surface of the bearing element preferably has a finish that is relatively smooth in relationship to the annular edge grooves of the race so that there is good bonding of the seals to the race and good sealing with the bearing element.

Two preferred embodiments incorporate linings that are bonded to the outer race prior to a swaging operation that locates the race edge grooves adjacent the spherical surface of the inner bearing element. The seals are bonded to annular edges of the lining during molding within the grooves of the race in order to provide additional securement of the seals in position against outward movement. One of the lined embodiments has counterbores defining its grooves such that the swaging operation forms the grooves with inwardly facing surfaces that cooperate with the bonding of the seals in order to prevent outward seal movement. The other lined embodiment has outwardly facing chamfers forming its grooves.

Two unlined embodiments also incorporate the annular seals which are molded within their associated race grooves in order to be bonded to the race. One of the unlined embodiments also incorporates the counterbored grooves that have inwardly facing surfaces formed by the swaging so as to cooperate with the bonding of the seals to the race grooves in order to prevent outward seal movement. The other unlined embodiment incorporates the chamfered grooves that face outwardly.

Preferably, polyurethane is utilized to form the elastomeric seals and is both polymerized and cured within the race grooves in order to provide good bonding of the seals to the race as well as good sealing with the spherical surface of the bearing element.

The objects, features and advantages of the present invention are readily apparent from the following detailed description of the preferred embodiments taken in connection with the accompanying drawings.

DETAILED DESCRIPTION OF THE PREFERRED EMBODIMENTS

Figure 1:
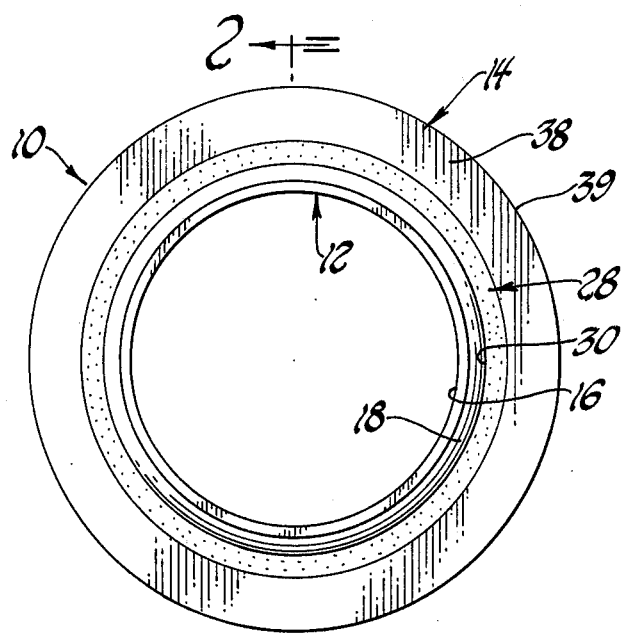
FIG. 1 is a side view of a spherical bearing made in accordance with the present invention.
Figure 2:
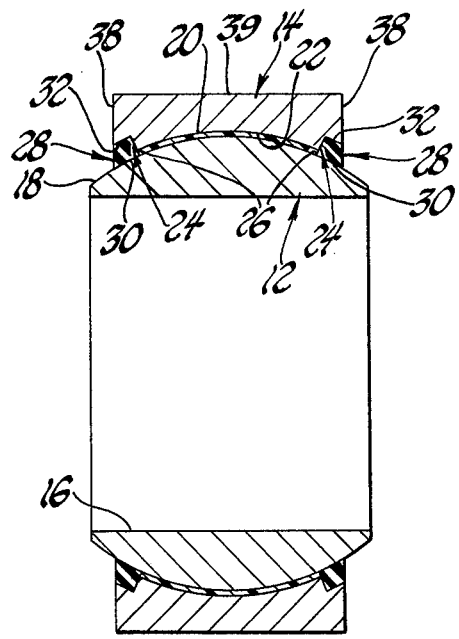
FIG. 2 is a sectional view of the bearing taken along line 2—2 of FIG. 1.

Referring to FIGS. 1 and 2, a bearing generally indicated by 10 is constructed according to the present invention by the method thereof and includes an inner bearing element 12 as well as an outer annular race 14. A central opening 16 of bearing element 12 permits it to be connected to a shaft or rod while an outer spherical surface 18 thereof is slidably engaged with a spherical race lining 20. The race lining 20 is bonded to an inner spherical surface 22 of the race and is made from a material with low friction characteristics. Preferably, the lining is made from a resin impregnated cloth incorporating polytetrafluoroethylene fibers or threads and also bondable fibers or threads such as those of cotton, polyester, or glass. However, other compositions and structures can be used to make the lining such as mixtures of polytetrafluoroethylene powder or flock and phenolic or other thermosetting or thermoplastic resins.

Race 14 includes annular edge grooves 24 that are located in a spaced relationship with respect to each other adjacent respective annular edges 26 of the lining 20. The surface finish of the grooves 24 is preferably relatively rough with respect to the outer spherical surface 18 of bearing element 12, i.e. the race grooves have a finish of about 125-250 microinches RMS while the spherical surface of the bearing element has a surface finish of about 8 microinches RMS.

Annular seals 28 are located within the race grooves 24 and are bonded thereto as well as being bonded to the annular edges 26 of the race lining. An inner annular surface 30 of each seal has a spherical shape and slidably engages the outer spherical surface 18 of the bearing element in a sealed relationship that prevents grit and forign material from entering the bearing between the slidably engaged surfaces of the spherical lining and the bearing element. Seals 28 are made from elastomeric material, as is more fully described later, and are molded within the grooves 24 so as to have a good bond with the grooves and the lining edges 26 as well as having a good sealed relationship with the bearing element surface 18.

Figures 3, 4:
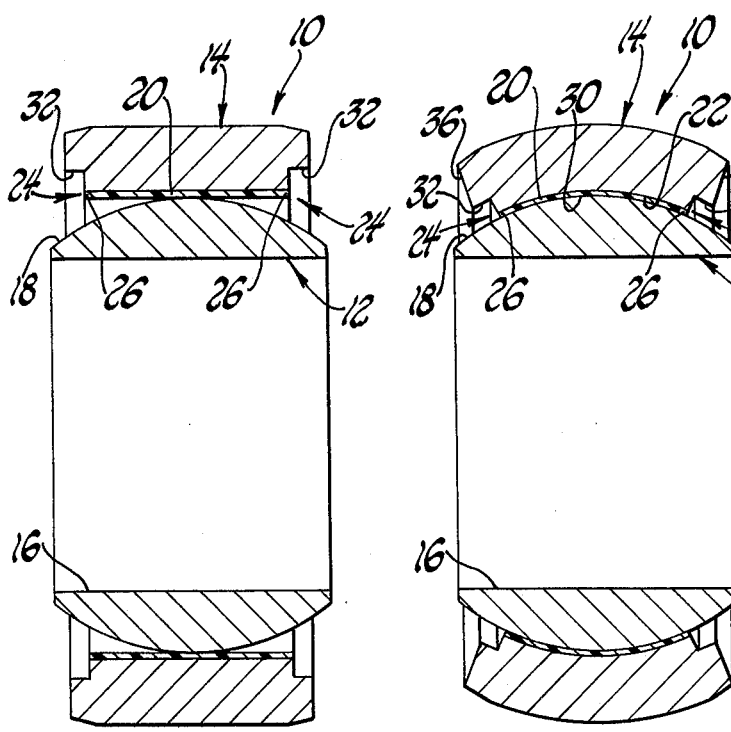
FIG. 3 is a sectional view taken in the same direction as FIG. 2 but illustrating an early step in the manufacturing of the bearing.
FIG. 4 is a view taken in the same direction as FIG. 3 but illustrating a later step in manufacturing the bearing.

As seen in FIG. 3, manufacturing of the bearing 10 shown in FIGS. 1 and 2 begins with an annular outer race 14 of a generally cylindrical shape whose interior receives and is bonded to the lining 20. Counterbores are provided in the race 14 so as to define the seal grooves 24 of the completed bearing. These counterbored grooves include cylindrical surfaces 32 oriented toward the central axis of the bearing. Inner bearing element 12 is inserted into the race 14 with its outer spherical surface 18 engaging the bearing lining 20. Prior to this insertion, spherical surface 18 is coated with a thin layer, or film, of a suitable release agent such as carnauba wax to assure that there will be no bonding between this surface and the lining 20 or the seals 28 of the completed bearing.

After the insertion of the bearing element 12 in the race 14 as shown in FIG. 3, a swaging operation is performed so that the race 14 is formed into the spherical shape shown in FIG. 4 with the lining engaging the spherical bearing element surface 18. Race 14 has an outer spherical surface 34 after the swaging operation and also has frustoconical edge surfaces 36 extending about the edge grooves 24. The swaging also causes the groove surfaces 32 to be oriented in an inwardly facing direction with respect to the bearings so that their outer portions have a smaller diameter than their inner portions.

Figure 5:
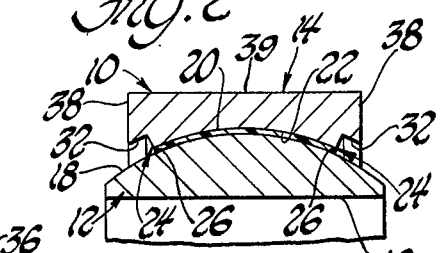
FIG. 5 is a partial view similar to FIGS. 3 and 4 but showing a still later stop in manufacturing the bearing.

After the swaging operation is performed so that the bearing has its configuration shown in FIG. 4, machining steps are performed on the race to provide flat edge surfaces 38 as shown in FIG. 5 and a round cylindrical outer surface 39.

After the bearing has assumed its configuration resulting from either the swaging operation as shown in FIG. 4 or the machining steps as shown in FIG. 5, a heating step is performed to the curing temperature of the phenolic or other thermosetting resin of the lining 20. This heating cures the resin so that the lining assumes a hardened condition in its final spherical shape.

With the bearing in its state of manufacturing shown in FIG. 5, the seals 28 are formed by an organic elastomeric material in a liquid or at least a soft and pliable condition. This material is poured or otherwise placed in each of the race grooves 24 so as to thereby be molded into an annular shape that fills the grooves. The elastomeric material bonds to the relatively rough race edge grooves 24 and to the lining edges 26 during this molding as well as sealingly engaging the bearing element surface 18 with a spherical shape. After the seals 28 have been molded in this "in situ" manner, the bearing can be heated to evaporate any organic solvents present or, if the elastomeric material is of the heat curable type, to cause curing of the seals. Roughness of the groove surfaces and the lining edges causes a bonding of the seals thereto while the smoothness of the bearing element surface 18 and the release agent applied to this surface helps prevent bonding of the seal material to the inner bearing element. Additionally, the inwardly facing orientations of the edge groove surfaces 32 on the race prevent outward seal movement in cooperation with the bonding of the seal material to the grooves and the lining edges.

Many elastomeric materials may be utilized to mold the seals 28 depending on the service requirements for the bearings being manufactured. For example, silicon rubber is known for its high temperature resistance as distinguished from other materials such as polyvinyl plastisols. Nevertheless, for at least most end uses of the bearings, the preferred material for molding the seals 28 is polyurethane elastomers. The precise formation or composition of the polyurethane elastomer is not critical; however, it should preferably be of high density, i.e. of solid, substantially noncellular form, as distinguished from low density, cellular polyurethane foam. Polyurethane elastomers are well known to persons working with seal materials and are desirable as being tough and having resistance to abrasion. These polyurethane elastomers also have low friction characteristics as compared with, for example, natural rubber. The components from which the polyurethane elastomer is formed are best reacted within the race grooves 24 as well as being cured within these grooves during molding. In connection with the curing, it is best to heat the reacted polyurethane elastomer for full curing, generally at a temperature of about 200°-250° F for from about 15 to 25 minutes. Also, the polyurethane elastomer may include a suitable filler, such as graphite, molybdenum disulfide, etc., that also increases the lubricity of the seals.

Figure 6:
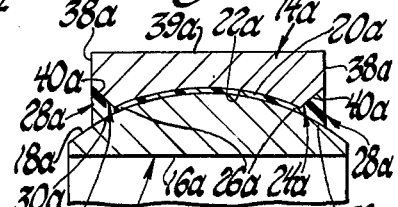
FIGS. 6, 7 and 8 are partial views taken in direction similar to FIG. 2 showing different embodiments of the bearing.
Figure 7:
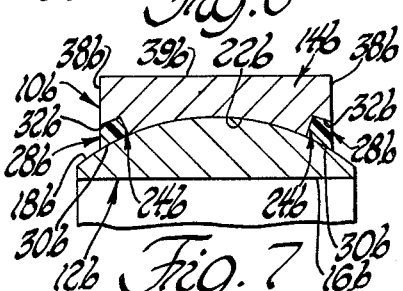
Figure 8:
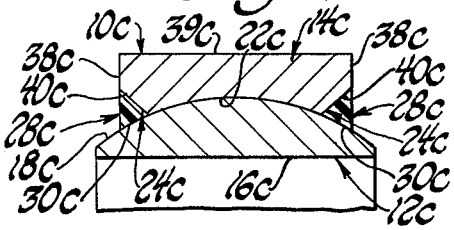

FIGS. 6, 7 and 8 disclose other embodiments of the bearing that are respectively indicated by reference numerals 10a, 10b, and 10c. Except for modifications that are discussed later, these embodiments are similar to the embodiment of FIGS. 1-5 and as such like reference numerals bearing the lower case letter subscripts are used to indicate the components and portions thereof. Consequently, the foregoing description is thus applicable to these embodiments except as is discussed.

With reference to FIG. 6, the bearing 10a is similar to bearing 10 of FIGS. 1-5 except that its edge grooves 24 are formed by chamfers 40a that face in an outwardly directly orientation with respect to the bearing. These chamfers are relatively rough, i.e. of a roughness about 125–250 microinches RMS as with the previous embodiment, so that good bonding of the seals 28a with the race 14a takes place as well as with the edges 26a of the bearing lining 20a.

The embodiment 10b shown in FIG. 7 is the same as the embodiment 10 shown in FIGS. 1–5 except that the spherical inner surface 22b of its race 14b does not include a liner, but rather is directly engaged with the outer spherical surface 18b of the associated inner bearing element 12b. The race edge grooves 24b and the seals 28b of this embodiment are the same as the grooves and seals of the FIG. 1–5 embodiment except that there is no bonding of the seals to any lining edges due to the absence of a lining. Also, it should be noted that the inner surface 22b of the race should have a roughness of about 16 microinches RMS so that it is somewhat rougher than the inner bearing element surface 18b which has a roughness of about 8 microinches RMS.

The embodiment 10c shown in FIG. 8 is unlined like the embodiment 10b of FIG. 7 but has race edge grooves 24c that are formed by chamfers 40c in the same manner as the chamfers 40a of the FIG. 6 embodiment. The surface finishes of the inner bearing element outer surface 18 and the inner race surface 22c are the same as those of the FIG. 7 embodiment while the surface finish of its chamfers 40c is the same as those of the FIG. 6 embodiment.

The manufacturing process used to make each of the bearings shown in FIGS. 6–8 is generally the same as the process used to make the bearing of FIGS. 1–5. However, the bearings 10a and 10c of FIGS. 6 and 8 do not have counterbores formed in them but rather have chamfers whose angular orientations change during the swaging operation that forms the race about the associated inner bearing element. Thus, a much shallower chamfer must be initially formed in the race when it is at the stage corresponding to FIG. 3 prior to the swaging and the swaging then gives the chamfer a configuration that is deeper to form the edge groove in which the associated seal is molded. Also, the embodiments of FIGS. 7 and 8 do not have the liners, as previously discussed, and the manufacturing steps utilized in connection with these liners are thus omitted.

Additionally, it should be noted that an acid type primer can be initially applied to the race edge grooves, as well as to the lining edges if the bearing is of the lined type, to help in the subsequent bonding of the seals during the molding within the grooves. One acid type primer that can be used is an amino silane in an ethanol solvent.

While preferred embodiments of the bearings and method for making the same have herein been disclosed in detail, those skilled in the art will recognize that various alternative designs and constructions may also be utilized and may be manufactured by the various alternative methods all of which are encompassed by the following claims.

What is claimed is:

1. A bearing comprising: a round metal bearing element having a spherical outer surface; a metal race of an annular shape receiving and supporting the bearing element for relative movement therebetween; said race having a pair of annular edge grooves spaced from each other and located adjacent the outer surface of the bearing element; and an elastomeric seal molded in situ within each edge groove bonded to the race and slidably engaged with the outer surface of the bearing element in a sealed relationship.

2. A bearing as in claim 1 wherein the race includes an inner surface of a spherical shape between the edge grooves thereof, each edge groove of the race including an inwardly facing surface that prevents outward seal movement in cooperation with the bonding of the seal to the groove, an annular lining of a low friction material bonded to the inner surface of the race and slidably engaging the outer spherical surface of the bearing element, and said lining having annular edges to which the seals are bonded during the molding thereof within the grooves.

3. A bearing as in claim 1 wherein the race includes an inner surface of a spherical shape between the edge grooves thereof, said race including outwardly facing chamfers forming the edge grooves thereof, an annular lining of a low friction material bonded to the inner surface of the race and slidably engaging the outer spherical surface of the bearing element, and said lining having annular edges to which the seals are bonded during the molding thereof within the grooves.

4. A bearing as in claim 1 wherein the race includes an inner surface of a spherical shape located between the edge grooves thereof in slidable engagement with the outer surface of the bearing element, and each groove including an inwardly facing surface that prevents outward seal movement in cooperation with the bonding of the seal to the groove.

5. A bearing as in claim 1 wherein the race includes an inner surface of a spherical shape located between the edge grooves thereof in slidable engagement with the outer surface of the bearing element, and said race including outwardly facing chamfers forming the edge grooves thereof in which the seals are bonded.

6. A bearing comprising: a round metal bearing element having a spherical outer surface; a metal race of an annular shape receiving and supporting the bearing element for relative movement therebetween; said race having a pair of annular edge grooves spaced from each other and located adjacent the outer surface of the bearing element; said grooves of the race having a rougher surface finish than the outer surface of the bearing element; and an elastomeric seal molded in situ within each edge groove bonded to the race and slidably engaged with the outer surface of the bearing element in a sealed relationship.

7. A bearing comprising: a round metal bearing element having a spherical outer surface, a metal race of an annular shape having an inner surface of a spherical shape receiving the bearing element; an annular lining of a low friction material bonded to the inner surface of the race and slidably supporting the outer spherical surface of the bearing element; said race having a pair of annular edge grooves spaced from each other and located adjacent the outer surface of the bearing element; each groove having an inwardly facing surface with a rougher surface finish than the outer surface of the bearing element; and an elastomeric seal molded in situ within each edge groove bonded to both the race and the lining and slidably engaged with the outer surface of the bearing element in a sealed relationship.

8. A bearing comprising: a round metal bearing element having a spherical outer surface; a metal race of an annular shape having an inner surface of a spherical shape receiving the bearing element; an annular lining of a low friction material bonded to the inner surface of the race and slidably supporting the outer spherical surface of the bearing element; said race having a pair of annular edge grooves spaced from each other and located adjacent the outer surface of the bearing element; each groove having an outwardly facing chamfer with a rougher surface finish than the outer surface of the bearing element; and an elastomeric seal molded in situ within each edge groove bonded to both the race and the lining and slidably engaged with the outer surface of the bearing element in a sealed relationship.

9. A bearing comprising: a round metal bearing element having a spherical outer surface; a metal race of an annular shape having a spherical inner surface receiving and supporting the bearing element for relative movement therebetween; said race having a pair of annular edge grooves spaced from each other and located adjacent the outer surface of the bearing element; each groove having an inwardly facing surface with a rougher surface finish than the outer surface of the bearing element; and an elastomeric seal molded in situ within each edge groove bonded to the race and slidably engaged with the outer surface of the bearing element in a sealed relationship.

10. A bearing comprising: a round metal bearing element having a spherical outer surface; a metal race of an annular shape having a spherical inner surface receiving and supporting the bearing element for relative movement therebetween; said race having a pair of annular edge grooves spaced from each other and located adjacent the outer surface of the bearing element; each groove having an outwardly facing chamfer with a rougher surface finish than the outer surface of the bearing element; and an elastomeric seal molded in situ within each edge groove bonded to the race and slidably engaged with the outer surface of the bearing element in a sealed relationship.

* * * * *